(12) United States Patent
Harmse

(10) Patent No.: US 6,819,964 B2
(45) Date of Patent: Nov. 16, 2004

(54) AUTOMATED CLOSED LOOP STEP TESTING OF PROCESS UNITS

(75) Inventor: Magiel J. Harmse, Cambridge (GB)

(73) Assignee: Aspen Technology, Inc., Cambridge, MA (US)

( * ) Notice: Subject to any disclaimer, the term of this patent is extended or adjusted under 35 U.S.C. 154(b) by 338 days.

(21) Appl. No.: 09/904,168

(22) Filed: Jul. 12, 2001

(65) Prior Publication Data

US 2002/0099724 A1 Jul. 25, 2002

Related U.S. Application Data

(60) Provisional application No. 60/217,753, filed on Jul. 12, 2000.

(51) Int. Cl.[7] .............................................. G05B 13/02
(52) U.S. Cl. .............................. 700/29; 700/28; 700/31; 700/32; 700/33; 700/34; 700/38; 700/67; 700/51; 700/52; 700/53; 700/73; 700/74
(58) Field of Search .................... 700/28, 29, 31–34, 700/38, 67, 51, 52, 53, 73, 74

(56) References Cited

U.S. PATENT DOCUMENTS

| | | | | |
|---|---|---|---|---|
| 3,534,400 A | | 10/1970 | Dahlin ..................... 235/151.1 |
| 3,934,124 A | * | 1/1976 | Gabriel ........................ 700/45 |
| 5,042,752 A | * | 8/1991 | Surauer et al. ............. 244/164 |
| 5,408,405 A | * | 4/1995 | Mozumder et al. ........... 700/31 |
| 5,457,625 A | | 10/1995 | Lim et al. .................... 364/149 |
| 5,546,312 A | * | 8/1996 | Mozumder et al. ........... 700/97 |
| 5,859,774 A | | 1/1999 | Kuzuya et al. ............. 364/176 |
| 6,587,744 B1 | * | 7/2003 | Stoddard et al. ............ 700/121 |

FOREIGN PATENT DOCUMENTS

| EP | 0 241 286 A1 | 10/1987 |
| EP | 0 334 698 A2 | 9/1989 |

OTHER PUBLICATIONS

Morris, A.S. et al., "Identification and direct digital control of an electric arc furnace controller," *IEEE Proc., D. Control Theory and Applications*. vol. 128, No. 3, Part D (May 1981) pp. 123–1281.

* cited by examiner

*Primary Examiner*—Anthony Knight
*Assistant Examiner*—Thomas Pham
(74) *Attorney, Agent, or Firm*—Hamilton, Brook, Smith & Reynolds, P.C.

(57) ABSTRACT

A multivariable process controller controls a chemical, polymer or other physical process. Slow tuning and over-conservative controlled variable values are employed during step testing. While all controlled process variables are within safe limits, only one manipulated variable (MV) at a time is step changed. Several manipulated variables are moved when process variables exceed safe limits to ensure that the controlled process variables return to the safe range, such that suitable MV targets for step testing are able to be automatically discovered within a closed loop control environment. Thus, the step test is able to be conducted mostly unsupervised and/or remotely via a telephone or network connection.

86 Claims, 5 Drawing Sheets

AUTOMATED CLOSED LOOP STEP TESTING OF PROCESS UNITS

RELATED APPLICATION

This application claims the benefit of U.S. Provisional Application No. 60/217,753, filed on Jul. 12, 2000, the entire teachings of which are incorporated herein by reference.

BACKGROUND OF THE INVENTION

Multivariable Process Control (MPC) algorithms, e.g., Dynamic Matrix Control (DMC), require sufficiently accurate dynamic models of the process unit to ensure high performance control and maintain closed loop stability. The accuracy of the model places an upper limit on the obtainable closed loop performance of the multivariable control system. However, there is a finite limit imposed on the obtainable model accuracy. This is due to the approximation error introduced by representing the real process, which is often non-linear, with linear models, and the ability to identify the model through a system identification process based on observed process data that is usually corrupted by noise and disturbances.

In general, the most cost-effective way to derive accurate models of a large-scale process unit, is to vigorously perturb the process unit with suitable test signals without exceeding safety or operability constraints. The process perturbations have to cover the full amplitude and frequency range of the unit. Several different types of test signals can be used, including steps, pulses, random white noise sequences, of pseudo-random-binary (PRBS) signals. In the process control industry, step test signals are widely used because it is easy to generate these signals manually, and the procedure is referred to as step testing. For the purposes of this discussion, perturbing a process unit with the intent of identifying an empirical dynamic model, is referred to as step testing, whatever test signals are used.

Step testing consists of making sufficiently large orthogonal and independent step changes in all the manipulated variables (MV's) of the process unit under careful supervision. Manipulated variables are those that are adjusted through actuators coupled to respective control valves, reactors, pumps/compressors, etc. forming the process unit and are for example feed rates, flow rate, temperature of a vessel, and the like. The step test data is then used in system identification algorithms to fit empirical dynamic models to the observed process responses. In order to minimize the duration and consequent cost of the step test, these step changes must be of sufficient amplitude to clearly observe the dynamic behavior of the process and maximize the signal to noise ratio. Correlation (dependence) between the MV's has to be minimized to ensure that accurate models can be identified.

Model accuracy results from using large step changes, ensuring minimal correlation between MV's and minimal feedback correlation, and ensuring that the step test sequence spans the full frequency range from very fast to very slow steps relative to the Time-to-Steady-State (TTSS) of the process. Unwanted feedback correlation results from the need to make frequent correcting moves in the MV's to counteract the effect of large unmeasured disturbances, and can degrade the accuracy of the model.

Control valves must also be prevented from fully opening or closing (valve saturation), and tank levels must be kept within the range of the level measurement devices. The fast high frequency dynamics of the process model are important to ensure high performance closed loop control. The slow low frequency dynamics (or process gains) is important to ensure accurate prediction of the future steady-state operating point of the process. This ensures that the optimizer built into the MPC algorithm will determine the most economically optimum steady state targets for the various process variables, and the MPC control algorithm will maintain the process close to the optimum targets, resulting in substantial economic benefit.

It is also important to introduce enough large steps to ensure that the identification algorithm can average out the effect of unmeasured disturbances. The duration of the test is a direct result of the frequency content of the process output signals resulting from the test signals, relative to the frequency content of the process outputs resulting from unmeasured disturbances. Where the process model matrix has a dominantly diagonal model structure (i.e., several units connected in a series structure), independently perturbing several or even all inputs simultaneously can shorten the test duration. Essentially, the signal to noise ratio of every CV (controlled variable, e.g., temperature, pressure, composition, product properties, etc.) in every frequency range of interest has to be maximized.

A significant part of the cost of implementing MPC on major process units, is the cost associated with using highly trained control engineers to supervise the unit while step testing is in progress. The project team often has to supervise the unit on a 24 hours per day, 7 days per week basis to ensure that the step changes do not cause the process unit to exceed safety or operability constraints. Full supervision greatly increases the cost of implementing MPC on large process units with a large MV count, and/or a long time to steady state. The need for an automated algorithm to conduct the step testing of the process unit while ensuring safe operation and keeping all the products within quality specification, while guaranteeing good identification results, has been recognized for a long time and will provide a substantial competitive advantage to its inventor.

Previous Approaches

Several approaches have been used before and are described in the academic literature. Some are summarized next.

Manual Step Testing: Essentially, two or three highly skilled process control engineers working shifts around the clock introduce manual step changes usually in one independent variable at a time, while supervising the unit around the clock. Any unacceptable deviations in the dependent variable are corrected for by introducing additional steps to move the process back to the safe operating region (correcting moves). If the process control engineers are highly skilled, then this approach can provide acceptable data and sufficiently accurate models, but this is not always easy, and it can be very expensive. However, there is a natural tendency to make changes in a fixed order and to respond to process disturbances by making correcting moves. This inadvertently introduces correlation into the MV sequence and makes the model identification problematic. In practice, it is quite difficult to prevent valve saturation and loss of tank levels, the manual step test sequence does not usually have sufficient high frequency content, and step changes are kept small enough to prevent large deviations in the CV's to reduce the risk of constraint violation. At present, this method is widely used in the process control industry.

Using a Programmed Step Test Sequence: This method relies on a sequence of carefully designed programmed step changes in every independent variable around a pre-defined average value, with the ability to manually adjust the average value and step size, or low and high limit values. Typically, the control engineer will choose a sequence based on process insight and good engineering practice to excite the fill frequency range of the process and ensure independence between the step test sequences. This method requires less intervention from the process control engineers once the sequence has been set up, but it still requires careful supervision, as the control engineer has to monitor the process closely, and move the average values when constraint violation occurs. High frequency content can be improved using this approach, but preventing valve saturation is still difficult. Once again, step change amplitudes are kept small enough to prevent excessive constraint violation, and it is still difficult to preventing loss of levels especially if automatic level controllers have to be disabled. This method can provide some improvements in terms of frequency content and reduced correlation, but does not reduce the cost of the project as full supervision is still required.

Using Pseudo Random Binary Sequences (PRBS): A PRBS sequence is automatically generated for every independent variable (MV). The PRBS method requires three parameters per independent variable (base period, amplitude, and sequence length). If these parameters are chosen appropriately, then the data will contain sufficient high frequency information. Since every independent variable will have a linearly independent sequence, all (or several of) the MV's can be stepped at the same time. This has the advantage that any CV's (controlled variables) that do not share the same MV's, will be perturbed at the same time, potentially reducing the time required to generate sufficient data to fit accurate empirical models. If all the MV's are perturbed at the same time, it is possible for the random sequence to occasionally generate steps in several of the MV's that may cause deviation in the same direction. For this reason, the amplitude of the step changes have to be reduced by dividing the amplitudes that could have been used if only one independent variable was stepped at any one time, by the number of MV's. This greatly reduces the amplitude of the steps, reducing the signal to noise ratio. Most process units are disturbed by large low frequency unmeasured disturbances, e.g. feed composition changes in chemical or refining process units. In such applications, a much larger amount of data has to be collected if small amplitudes have to be used. Full supervision is still required. Some cost advantage can be achieved due to a potentially shorter step test, but the need for careful supervision cannot be removed, limiting the achievable cost saving.

Superimposing PRBS Signals on top of Controller Outputs: A more sophisticated approach is to use a closed loop control system, e.g., an MPC system like DMC, and superimpose independent PRBS signals on top of every MV. The MPC controller will always respond by ramping out the pulse to return to the previous steady state targets. This modification generates sufficient medium to high frequency information, but it will not excite the low frequency dynamics of the process. In order to generate accurate gain estimates, large step changes in every limiting (or active) dependent variable has to be made, and at least some of these steps have to be maintained for the full TTSS. This improves the low frequency content of the data, but at the expense of a higher level of unwanted MV correlation. This approach has the advantage that it requires little or no supervision once a suitably accurate model has been determined. However, it has the disadvantage that an initial model needs to be available. A further more limiting disadvantage is the fact that all the MV's will move in a highly correlated way. This can cause numerical difficulties for the system identification algorithm, leading to poor model accuracy. Another problem stems from feedback correlation appearing in the MV's due to noise and disturbances in the CV's, which also makes the system identification problem much more difficult. Since the controller responds to maintain the CV at their targets and limits, all the MV's will exhibit correlation. The nearly ideal PRBS signals on each MV will be diluted by the correlation effect resulting from the control action. If the controller is slowly tuned, and large PRBS amplitudes are used, then the PRBS signal can swamp the controller action, in which case the data appears nearly open loop. Ideally, correlation between MV's, and between CV's and MV's must be minimized as far as possible. Specifically, a high degree of feedback correlation due to high frequency noise and unmeasured disturbances is known to cause failure of multivariable model identification algorithms.

SUMMARY

The previously mentioned method is substantially enhanced to overcome the stated problems and disadvantages. As before, an initial dynamic model is used to control the process. It is accepted that this model is not accurate enough for high performance process control, but if slow controller tuning and sufficiently over-conservative CV limits are used, the system can be set up to maintain stability, and reject external disturbances without violating the real process constraints.

Typically, only the major MV/CV responses are included in the initial model, and the sign of these responses must be correct. Where there is doubt about the gain and/or dead time of the model curves, it is safer to use higher rather than lower values. The ability of the initial model to serve as an adequate basis for controlling the process unit, is confirmed by making large programmed target and/or limit changes in every active CV. Where unstable and/or highly underdamped closed loop responses are observed, the CV steps can be repeated with only one major MV active at any time. In this way, the specific MV/CV pairs causing the poor closed loop response can be identified. It is then relatively straight-forward to increase the model gain in large steps (e.g. 2x) until acceptable performance is achieved. Where the closed loop performance is very slow due to unreasonably high model gains, the previous approach can once again be used to identify the responsible MV/CV pairs, and the model gain can be reduced in large steps until acceptable performance is achieved. The data collected during this procedure is of course highly correlated. However, this data can be combined with good quality independent and uncorrelated test data as long as the total amount of correlated data is less than approximately 20% of the total data set.

The system model can be improved periodically by importing the latest data and re-running the model identification. Where an initial model is not available, any of the existing testing methods can be used to generate a suitable initial model from only a small number of steps. An initial model of low to moderate accuracy is acceptable. For example, the initial model may be derived from a non-model based process control system, may be an existing model from a potentially different but similar process system, may be derived from a manual step test of the subject process being modeled, or may be derived from engineering knowledge of the subject process being modeled.

The previously mentioned approach where large programmed step changes are made in active CV targets can be used every few days to monitor model convergence and provide a stopping criterion. In this way, a large amount of system model identification and controller tuning and commissioning work can be accomplished in parallel with the step testing activities. Some of this work may also be done remotely via a high-speed communication link. These methodology enhancements can dramatically reduce the amount of engineering supervision required and the total cost of an MPC project.

In a preferred embodiment, the present invention method models a process system employing the steps of:

(a) modeling a subject process system with an initial model;

(b) coupling to the subject process system a multivariable process control system that utilizes said initial model, to control the subject process system;

(c) tuning said multivariable process control system for stable operation of the subject process system; and (d) using data generated from said subject process system, generating an improved model of the subject process system, said steps of tuning and generating effectively perturbing the subject process system to generate data for model identification of the subject process system.

The steps (b) through (d) are repeated with the improved model as the initial model, such that a further improved model is generated. In a preferred embodiment, the multivariable process control system employs a constrained, model-based controller.

In accordance with one aspect of the present invention, the step of coupling to the subject process system includes computing process control action for controlled variables and manipulated variables following an objective function J. Preferably the objective function J is extremized.

Further the step of coupling to the subject process system includes augmenting the initial model with shadow system controlled variables. The shadow system controlled variables are mathematically and functionally equivalent to system manipulated variables which may be treated as system controlled variables. One or more of the system manipulated variables or shadow system controlled variables are moved or stepped simultaneously. In addition, one or more of the system manipulated variables or the shadow system controlled variables may be moved or stepped for desired amounts of time (either fixed or varying). In a preferred embodiment, a pseudo random binary (PRBS) sequence is superimposed on the moves or steps of the system manipulated variables and shadow system controlled variables.

In accordance with another aspect of the present invention, the gain relationship between a system manipulated variable and a system controlled variable is determined and normalized to unity. The multivariable process control system then utilizes the normalized gain relation as the shadow system controlled variable. Further the shadow system controlled variable targets are adjusted to prevent shadow system controlled variables from violating subject process control variable limits.

In accordance with another aspect of the present invention, the step of coupling to the subject process system includes constructing and controlling equivalent system manipulated variables. The values of the equivalent system manipulated variables are equal to the initial model predicted values when controlled variables of the subject process system are within subject process limits. Preferably the step of controlling equivalent system manipulated variables is in accordance with one of:

an objective function J;

a simultaneous moving of one or more shadow system controlled variables or system manipulated variables;

for an amount of time, moving of one or more shadow system controlled variables or system manipulated variables;

a superimposed PRBS sequence;

a normalized system manipulated variable-system controlled variable gain, the normalized gain being normalized to unity and used as the shadow system controlled variable; and an adjustment of shadow system controlled variables targets to prevent shadow system controlled variables from violating subject process control variable limits.

In the preferred embodiment the step of coupling the subject process system includes imposing a dead zone on controlled variables of the multivariable process control system. The dead zone is computed by accumulating relatively small manipulated variable control action from the multivariable process control system. The control action is implemented when the summed control action reaches a predefined threshold. In addition, the controlled variables are filtered to attenuate high frequency noise.

In accordance with another aspect of the present invention, the step of coupling to the subject process system includes creating a time varying, almost periodic limit cycle of manipulated variables of the subject process system.

In accordance with another aspect of the present invention, suitable target values for the system manipulated variables of the subject process system are either chosen manually by a human operator or calculated by one of:

a middle value of process control limit values for controlled variables of the subject process system;

a partial least squares analysis;

a principle components analysis; and a value furthest away from process control limit values of both manipulated variables and controlled variables of the subject process system.

Preferably the suitable targets for system manipulated variables are automatically determined and implemented by a digital processing system. In this manner a reduction of engineering supervision is enabled. Further the manipulated variables are stepped or moved in a random way about the suitable targets while keeping the manipulated variables and controlled variables of the subject process system within process control limits.

In accordance with another aspect of the present invention, the step of tuning the multivariable process control system includes adjusting internal variables of the multivariable process control system. The adjusting of internal variables is accomplished in a manner that improves process control action and ensures process system safety. Further the adjusting reduces feedback correlation between control action of the multivariable process control system and disturbances of the subject process system. The disturbances include unmeasured extraneous influences affecting the subject process system and not captured in the initial model.

In accordance with another aspect of the present invention, the step of using data and generating an improved model includes using a system identification algorithm and analyzing values of manipulated variables and controlled variables of the subject process system to create an improved model.

Apparatus for modeling a process system implements the foregoing method. Preferably computer means coupled to a multivariable process controller executes the method and effectively perturbs the subject process system to generate data for model identification.

Similarly a controller implements the foregoing method. The controller comprises a digital processor and a program storage device that is readable by the digital processor. The program storage device encodes a program of instructions for performing the method of modeling a subject process system. Other embodiments or applications of the invention method are in the purview of one skilled in the art having the following disclosure before him.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1A:
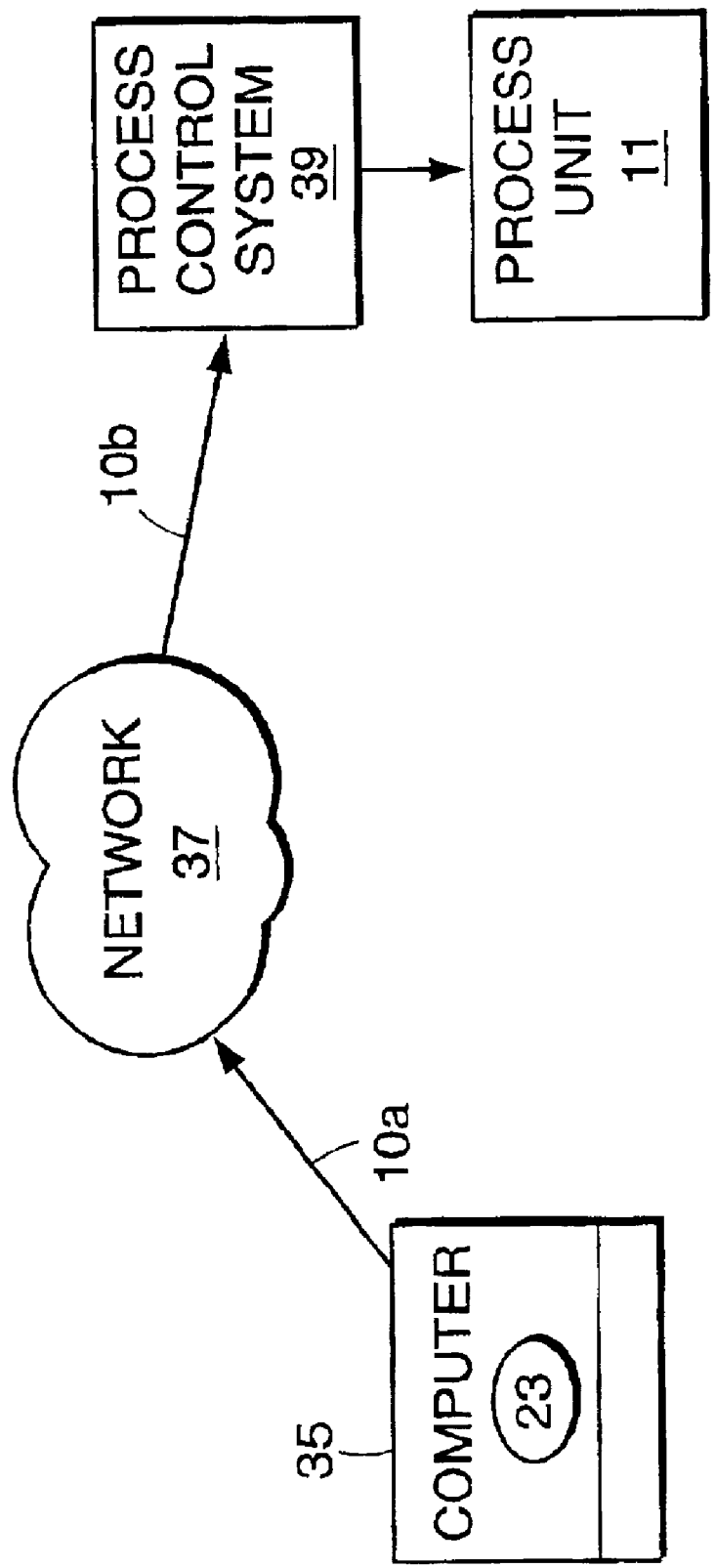
FIGS. 1A and 1B are schematic views of a multivariable process control system embodying the present invention.
Figure 1B:
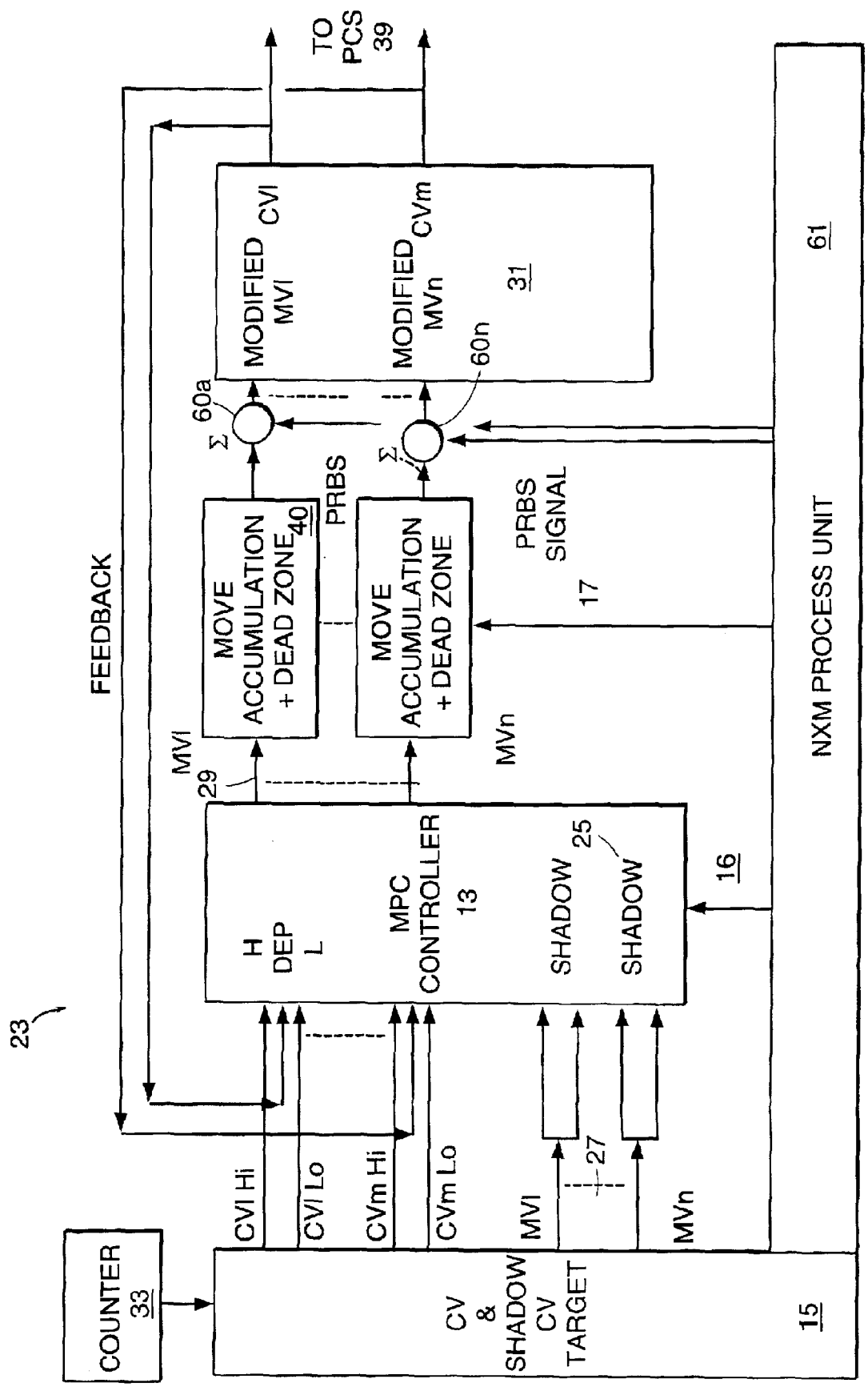

Illustrated in FIGS. 1A and 1B is a multivariable process control system 23 embodying the present invention. In the preferred embodiment, the multivariable process control system 23 is implemented in software, hardware, or both executed on computer processing means 35. The computer processing means 35 is coupled in communication (for example, via a network 37) with process control system 39. The process control system 39 controls the subject process 11 using techniques and mechanics common in the art. The network 37 may be a local area network (LAN), a wide area network (LAN) and/or part of a global network (e.g., the Internet). Network 37 provides access to computer means 35 and process control system 39 across communication lines and the like common in the art. In the preferred embodiment, communication lines 10a, b are high speed communication links which enable remote access/operation of the invention system 23.

With reference to FIG. 1B, the preferred embodiment of multivariable process control system 23 is detailed as follows. An MPC controller 13 models the subject process unit 11 which is formed of various pieces of equipment, e.g., distillation columns, stirring tanks, vessels, pumps, conduits, valves, inlet feeds, outlet feeds, etc., coupled together in pertinent series or stages. Respective operating temperature, pressure and/or volume of each stage (piece of equipment) are represented by independent variables called manipulated variables (MV's). The subject contents of the pieces of equipment is the product of the process unit 11. Quality of the product is measured by physical or chemical aspects such as composition and physical properties. These quality aspects are represented by control variables (e.g., temperature, pressure, composition, product properties) throughout the process 11.

In the preferred embodiment, MPC controller 13 is a constrained model based system. Controller 13 employs either an explicit model (describable by a mathematical equation) or an implicit model (not describable by a mathematical equation). Further, controller 13 employs sliding mode control, switching mode control structures and/or variable structure control as known in the art.

The present invention introduces the following innovations.

The MPC controller 13 model matrix is appended with dummy unity gain models 15 to define so-called shadow CV's 25 that are essentially copies of the input MV's 27. Every shadow CV 25 has no other model curves except against its own MV 27, and this model 15 is a pure unity gain model with no dead time and no dynamic transient. By programming large independent step changes in one shadow CV 25 at a time, with at least some of the steps lasting for a full time to steady state, it is possible to ensure perpendicular step testing (steps in one direction at a time), removing all correlation between MV's 27. This ensures an easy system identification problem, especially if Finite Impulse Response (FIR) model identification is used. In large-scale applications where the model matrix of controller 13 is nearly diagonally dominant, several independent shadow CV target changes can be introduced concurrently (e.g. one MV being stepped per distillation column in a gas plant).

Ideally, the maximum amplitude step changes need to be made to maximize the signal to noise ratio. The present invention modifies the controller 13 to only follow these step changes in the shadow CV's 25 if none of the original process CV's (stored in 15) will violate their safety and operability limits (i.e. prevent constraint relaxation). This makes it possible to request large step changes in the shadow CV's 25 to maximize the signal to noise ratio, and allowing the MPC controller 13 to determine the largest possible step change amplitudes within the safety and operability constraints of the process unit 11.

Figure 2:
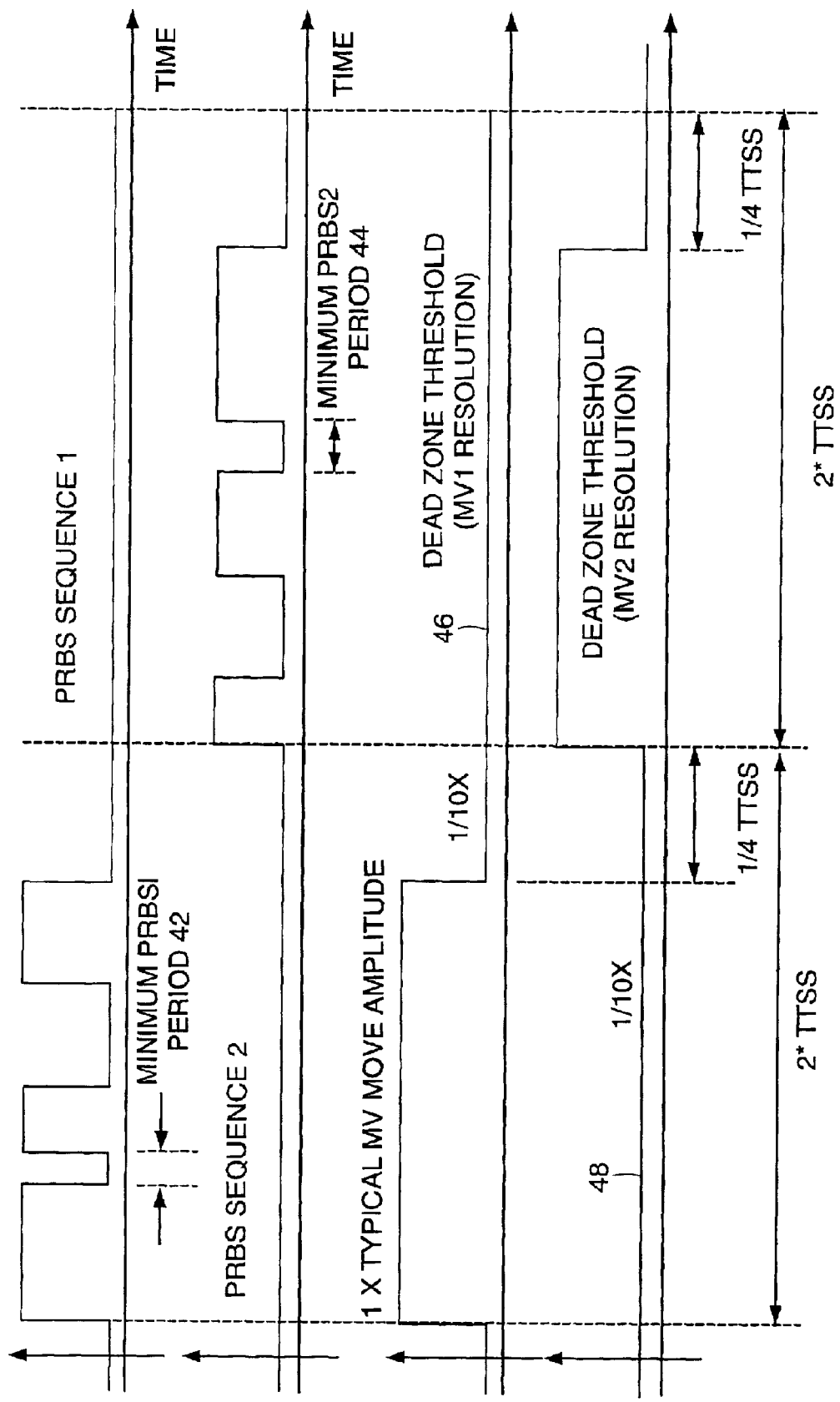
FIG. 2 is a timing diagram of PRBS sequences superimposed on manipulated variables output by the process controller in FIG. 1.

A slow PRBS sequence 17 is superimposed on the MV's 29 output by controller 13 to improve the medium to high frequency content of the step test data. The minimum pulse width has to be chosen relative to the TTSS, typically in the range 10% to 50% of the dominant time constant of the process 11. However, these steps are only added if the process 11 is far away from critical safety or operability constraints, and is only added to the MV being stepped at the time. FIG. 2 is illustrative of the step moves 40 of MV's 29 superimposed with respective PRBS sequence 17.

Illustrated in FIG. 2 are timing lines of two MV's (output 29 from MPC controller 13) referenced as MV1 and MV2. The top time line shows the PRB sequence 1 which is superimposed on MV1. The minimum pulse width is indicated at 42. The next time line shows the PRB sequence 2 which is superimposed on MV2. PRB sequence 2 has a minimum pulse width shown at 44. The third time line shows the MV1 move amplitude which is stepped up in the first two time to steady state (TTSS) periods and falls to a dead zone threshold 46 at a quarter TTSS before the end of that period. MV1 remains at the dead zone threshold 46 for the succeeding two TTSS periods. The last time line shows the MV2 move amplitude at a respective dead zone threshold 48 for the first two TTSS periods. The MV2 move amplitude is stepped up for the succeeding two TTSS periods, and stepped down at a quarter TTSS before the end of that period.

Alternatively, the PRBS 17 amplitude can be reduced as the process 11 moves closer to hard constraints. Another alternative is to pre-select the safe direction in which to introduce pulses.

Optionally, instead of using simple unity gain models (with no dead time or dynamics) 15 for the shadow CV's 25, it is advantageous to select the slowest CV response for that particular MV 27. If this response is normalized to have unity gain, it can be used as the only model 15 between the shadow CV 25 and the corresponding MV 27. If the MPC controller 13 is then tuned aggressively (i.e., high bandwidth), step changes in the shadow CV 25 will result in near inversion of the slow process response, with the output MV sequences 29 consisting of an approximate step with an initial pulse superimposed on top of the step. This further improves the high frequency content of the data. The standard MV ramp constraints are still observed to prevent excessively fast MV 29 movement.

Optionally, instead of fixed step lengths imposed on the shadow CV's 25, it is advantageous to impose a PRBS sequence 17 with a slow basis period relative to the Time to Steady State of the process 11. This spans the full frequency range better than long steps. In applications where it is desirable, independent PRBS signals 16 can be imposed on several or even all shadow CV targets 15 to reduce the total test duration.

Optionally, the shadow CV targets 15 can be ramped away from constraint situations to prevent shadow CV's 25 from being infeasible. This way, if large disturbances occur in the original CV's, the controller 13 will not typically need to make adjustments as they are still far enough away from the respective limits. This further reduces feedback correlation due to large unmeasured low frequency disturbances affecting the CV's and subsequently appearing in the MV's 29. To further prevent feedback correlation, the weight that the controller 13 attributes to process CV's when they are between their low and high limits, is set to zero, effectively turning them off.

By imposing sufficiently large dead zones on the controller outputs 29, it is possible to largely prevent a high degree of correlation between process CV's and MV's due to high frequency noise (i.e., feedback correlation). This modification essentially prevents small moves in the MV's 29 (controller outputs). In the preferred embodiment, this is achieved by internally accumulating (at 40) small moves in the controller outputs 29 while keeping the controller output constant, until the accumulated move 40 exceeds a suitably chosen threshold value at nodes 60. If the threshold value 60 is chosen large enough (approximately the same amplitude that would be used for a manual step test), then the noise correlation can generally be removed from the controller outputs 29. In addition, a low pass filter is used to attenuate the high frequency noise component in the CV's. This modification makes it possible to reduce the size of the threshold values 60 of the dead zones on the controller outputs 29.

Alternatively, the dead zone is generated by modifying mathematical formulation of the multivariable process control system 23. The mathematical formulation may employ discrete or binary system manipulated variables for example. In other embodiments the dead zone may be generated by an analog to digital converter or by a pulse width modulation.

Figure 3:
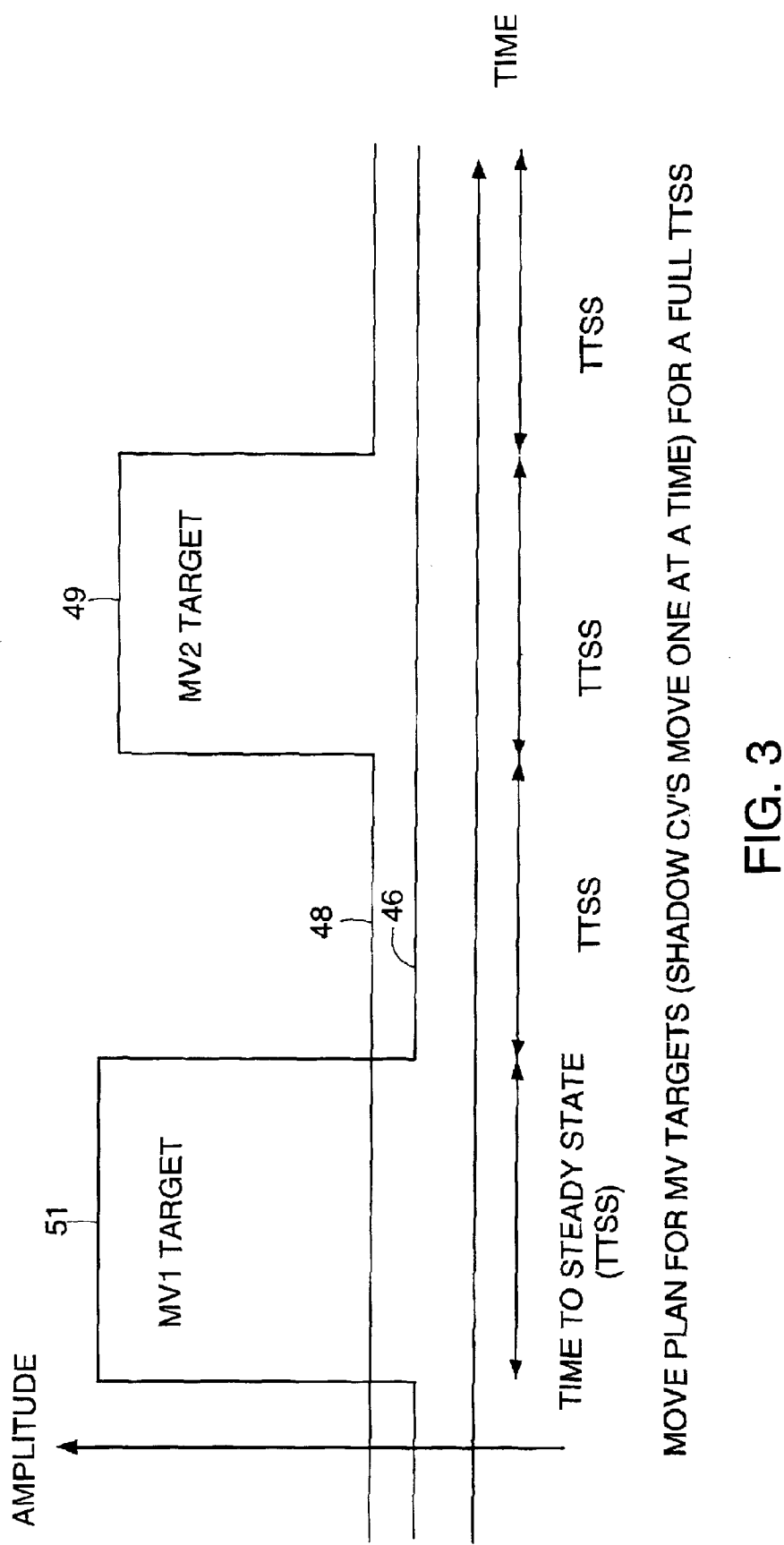
FIG. 3 illustrates a move plan for manipulated variable targets in the system of FIG. 1.
Figure 4:
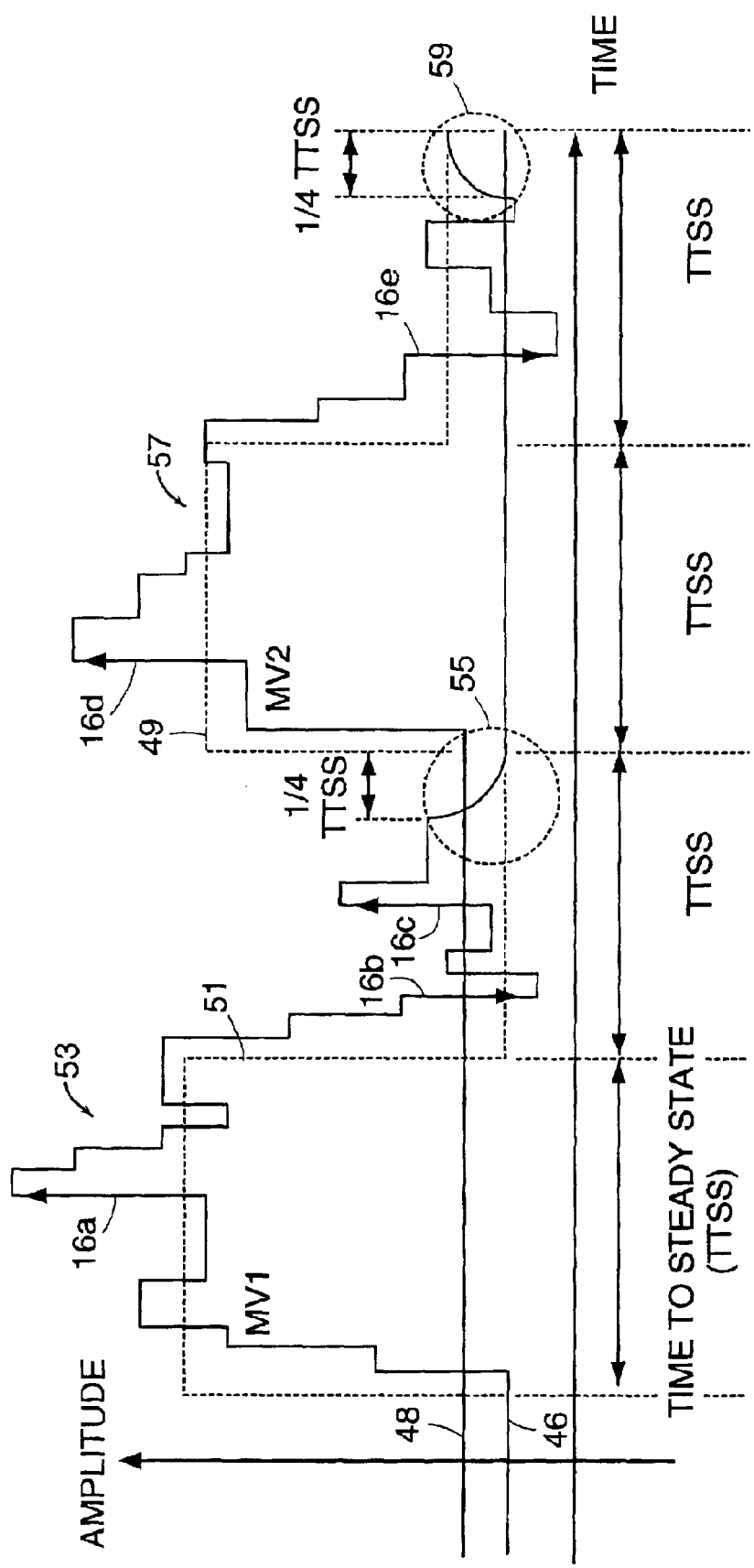
FIG. 4 illustrates manipulated variable moves as affected by random PRBS pulses in the system of FIG. 1.

Once the process reaches steady state, a periodic limit cycle will develop unless the threshold parameters varied randomly. In the present invention, the threshold is changed randomly between 50% and 150% of the nominal value. This prevents exact periodic steps, which can confuse the system identification algorithm. By superimposing PRBS pulses 17 on top of the MV's 29, the controller 13 will attempt to ramp back to the MV target 51, 49 values, and a series of nearly triangular pulses will be observed as illustrated in FIGS. 3 and 4 (discussed later). These PRBS pulses 17 are only added to the MV's 29 if all the critical CV's are well within range, to prevent excessive limit violation. Once again, the preferred implementation is to move only one MV at a time as that makes the identification problem very easy. It also makes it simple to interpret predicted model responses by comparing with observed responses and visually identifying poor models.

Referring to FIG. 3, a move plan for the MV's 29 (MV1 and MV2) of FIG. 2 is shown. The target move amplitude 51 for MV1 is shown stepped up at the beginning of and remaining through the first TTSS period. The target move amplitude 51 for MV1 returns to its dead zone threshold value 46 at the beginning of the second TTSS period and stays at that value for the succeeding three TTSS periods. The target move amplitude 49 for MV2 is illustrated as being at its dead zone threshold value 48 for the first two TTSS periods. Target move amplitude 49 for MV2 is stepped up for the third TTSS period and returns to the dead zone threshold value 48 for the fourth TTSS period. As such, the plan is to move/step each MV 29 (e.g., MV1 and MV2) one at a time, for a full TTSS period. This move plan (i.e., MV1 and MV2 targets 51, 49) is illustrated in dotted lines in FIG. 4 for comparison to actual MV move results with superimposed PRBS pulses 17.

In a preferred embodiment, target amplitude values for MV's 29 (shadow CV's 25) are calculated by a robust steady-state target calculation as disclosed in U.S. patent application Ser. No. 09/266,709 filed Mar. 11, 1999 and related U.S. patent application Ser. No. 09/819,475 and PCT/US99/22368, each incorporated herein by reference.

Illustrated by signal line 53 in FIG. 4 is PRBS sequence 1 (of FIG. 2) superimposed on the MV1 move amplitude values (of FIG. 2). An additional random PRBS pulse 16a (illustrated as an up-arrow) is also included. The resulting MV1 amplitude values form a pattern of about three nearly triangular pulses in the first TTSS period. The MV1 amplitude is stepped down in the second TTSS period with random PRBS pulses (arrows) 16b and 16c. In the last quarter of the second TTSS period, controller 13 ramps MV1 down to the target move values for that time period, i.e., dead zone threshold 46. This ramping down is illustrated at 55 in FIG. 4.

Similarly signal line 57 shows the results of PRBS sequence 2 (of FIG. 2) superimposed on the MV2 move amplitude values of FIG. 2. Additional random PRBS pulse 16d is included and results in a nearly triangular pulse that runs through the third TTSS period illustrated. In the fourth TTSS period, the MV2 amplitude is stepped down with random PRBS pulse 16e. In the last quarter TTSS of the fourth TTSS period, controller 13 ramps MV2 toward the target move value 49 for that time period, i.e. dead zone threshold 48, as illustrated at 59 in FIG. 4.

A crucially important feature of the present invention is the ability to automatically discover suitable MV (i.e. shadow CV 25) targets. The algorithm goes into "HOLD" mode if any critical CV exceeds the CV limit by more then a pre-set safety margin. All step testing is then suspended, all MV's are enabled, MV tuning is slowed down, the shadow CV limits are opened as wide as possible, and the critical CV's (e.g. levels, product quality and valve positions) are clamped around the middle of the range (around the ideal values). This allows the MPC controller 13 to slowly move all the critical CV back to sensible values using all the MV's.

Once the critical CV's get close enough to the ideal values, the current MV values are stored (at 31 in FIG. 1) and will be used for future MV targets (i.e., shadow CV targets 15), and the step testing is resumed.

When the algorithm enters "HOLD" mode, all the MV's move in a highly correlated way, and this data will have to be removed if a weak system identification algorithm is used. If more sophisticated algorithms are used, then some minimal amount of correlation is acceptable. In general, the algorithm has been designed to minimize the need for entering HOLD mode, by setting the CV ranks on the shadow CV's 25 to be less important than all the process CV's, and through selective use of Minimum Movement variables.

The algorithm also has a feature to allow manual changes to the MV targets. This is useful if the process operator has advanced warning of an impending change in the operating condition of the unit that will require a change in the MV targets (e.g. an impending feed rate change). The ability of the algorithm to discover suitable MV targets automatically within a closed loop control environment, makes it possible to conduct the step test mostly unsupervised. The ability to conduct a remote step test via a telephone or network connection, also becomes possible.

MV tuning is also varied, depending on whether actual CV's are active (predicted to reach their limits). When only shadow CV's 25 are active, the models are perfectly accurate, and the controller 13 can be tuned very aggressively under these conditions (high bandwidth). If any actual CV becomes active, MV tuning has to be slowed down as some inaccurate models may be used to control this CV. If the MPV controller 13 relaxes CV targets 15, then very slow tuning will be used, as several poor models may be active. Typically, within a few days, the new automated step test data can be used to improve the models and more aggressive tuning can be used to better reject disturbances. Less conservative CV limits can then be used.

A slow PRBS sequence 17 is superimposed on the MV's 29 to improve the frequency content of the step test data. However, these steps are only added if the process is far away from critical safety or operability constraints, and is only added to the MV being stepped at the time.

Optionally, instead of using simple unity models (with no dead time or dynamics) 15, it is advantageous to select the slowest CV response for that particular MV, normalize the gain to unity, and use that as the only model between the shadow CV 25, and the corresponding MV 27. If the MPC controller 13 is then tuned aggressively (i.e., high bandwidth), step changes in the shadow CV 25 will result in near inversion of the slow process response, with the MV sequences 29 consisting of an approximate step with an initial pulse 17 superimposed on top of the step. This further improves the high frequency content of the data.

Optionally, instead of fixed step lengths imposed on the shadow CV targets 15, it is advantageous to impose a PRBS sequence 17 with a slow basis period relative to the Time to Steady State of the process. This spans the full frequency range better than long steps. If these PRBS driven target changes are done concurrently, it can reduce the duration of the plant test.

One alternative embodiment includes imposing variable dead zones and implementing internal move accumulation to enforce staircase signals on every MV, and low pass filtering all the CV's. This greatly reduces feedback correlation due to high frequency noise and unmeasured disturbances.

Alternatively, use internal move accumulation of MV's and impose fixed dead zones by employing an Analogue to Digital (AD) Converter with very low resolution (2 to 4 bit binary resolution) for the range allowed in the MV. This alternative instantiation reduces the effect of high frequency feedback correlation appearing in the MV sequence every time the threshold value is exceeded.

A further improvement may be made by randomly varying the resolution of the AD converter between 2 and 4 bits. This will cause the amplitude and period of the resultant limit cycle to vary randomly, reducing auto-correlation in the MV sequence.

A further enhancement may be made. Reset the internal move summation variable to the current MV process value every time a change in the AD output results, i.e. remove the round-off error from the summation variable. This enhancement further reduces high frequency feedback correlation in the MV sequence.

In accordance with the foregoing, the operation of MPC controller 13 effectively creates a closed-loop process control system that generates values for manipulated variables and controlled variables of the subject process unit 11 for model identification. In the preferred embodiment, a system identification routine (computer program) analyzes the values of the manipulated variables and the controlled variables and creates an improved model of process unit 11. The generated data 31 is effectively an open-loop process control system.

Summary of Fortran code of the preferred embodiment is provided next followed by corresponding pseudocode.

Initialization
1. Initialize all Variables
2. Initialize internal copies of the current PCS value, and the move summated value to the current process values
3. Set the master counter 33 to zero.

Repeat:
1. Read the mode flag and if required pit the program into SUSPEND mode to suspend the step test.
2. If the mode flag indicates that the user wants to reset the SUSPEND flag, then the SUSPEND flag is returned to normal (0), and the step test is resumed.
3. If the mode flag indicates that the user wants to force the program into HOLD mode, then set HOLD to 1.
4. If in HOLD mode, open up all MV limits, clamps the CV limits around the middle of the CV range, and ramps all the MV's until the critical process CV's have nearly reached the middle of the range to re-initialise the MV targets.

Hold and Initialization Checks:
5. If the program is not in HOLD mode, and any critical process CV value exceeds the Maximum or minimum limits by a predetermined margin, then go into HOLD mode.
6. If the program is not in SUSPEND mode, but HOLD is ON, then for all the critical CV's, clamp the CV limits close to the ideal CV target values 15 to prepare the process for MV target re-initialization, else keep the limits wide (at CV Minimum and CV Maximum values).
7. Set the Initialization flag equal to the HOLD flag (while the program is in HOLD mode, always attempt to initialize). INIT=1 indicates that the program is in the process of initializing. Once all the checks have been completed, INIT=0 indicate that initialization has failed (some CV's are still too far away from the optimal middle-of-range targets).
8. If the program is still trying to initialize (i.e., it has not yet failed an initialization condition), then if all the critical CV's are within a pre-set distance from the optimal process CV targets 15, then keep INIT=1, else turn it off (it failed to initialize).

Grab New MV Targets:

9. If the initialization checks were successful, (INIT still at 1), use the current MV values on the Process Control System (PCS) 39 to initialize the new MV targets 27. The new MV steps will take place around these targets, until a critical process CV exceeds a high or low limit by more than the specified amount.
10. If initialization was successful, then Reset HOLD to zero, else stay in HOLD mode.
11. If still in HOLD mode, then keep on trying to initialize, if not in HOLD mode, then don't try to. Calculate a pseudo random fraction between −1 and 1.

Generate PRBS Signals 17:

12. Generate a fast PRBS sequence 17 with amplitude 2*MV Tolerance and store. This signal 17 can potentially change every step. When the PRBS counter equals the PRBS base Period, then store the new current PRBS value, and keep the slow Pulse signal constant for at least the PRBS pulse Period.
13. Prevent any PRBS pulses 17 if the respective MV 29 is not being stepped, and set it to zero.
14. If the program is in HOLD mode, then don't add any PRBS pulses 17.
15. If the critical process CV's are not exceeding their limits too much, then keep PULSE the same, else set to zero (no PRBS pulses if critical CV's are too close to their limits).
16. If the PRBS pulse counter exceeds the PRBS pulse period, then reset the counter to zero, else increment counter by one.
17. Calculate random real fraction.
18. If the MPC controller 13 aborts, then don't increment the master counter 33.
19. Calculate a random real fraction.

Check if MV re-initialization is required:

20. If the difference between the internal copy of what should be on the PCS MV tag and the actual feedback value just read in, are different by more than the MV tolerance (dead zone threshold), then reset the master counter to zero. This will force the program to use the current MV value to re-initialize the internal move summated MV values (re-initialize the internal move calculation). This situation can happen for several reasons. Either the last MV write did not arrive on the PCS, or the read-back echo is one or more steps late, or someone has reloaded an old Controller Configuration, and the internal copy of the MV value is out of date. In such a case, the current one summated MV value must not be written out as it will bump the process hard, and it has to be re-initialized at the current MV value.
21. If the master counter 33 is less than 1, then set the move summated MV's equal to the current MV values on the PCS to re-initialize the move accumulation, else keep it the same (for now).

Implement Move Accumulation:

22. If the MV loop status is ON, then set Move Summated MV=Move Summated MV+Current Move to achieve move accumulation.
23. Keep the Move Summated MV between upper and lower MV limits.
24. If the difference between the internal copy of what is on the PCS MV tag and the Move Summated MV value exceeds the variable dead zone threshold, then set the internal copy of the PCs MV tag equal to the Move Summate MV value, else keep it the same. The minimum move threshold is typically varied between 50% and 150% of the nominal value stored in MVTOL, but a wider range can also be used.
25. Add (superimpose) the PRBS pulse signal 17 on top of the new MV value 29, and write it out to the PCS.

Maintain Counter 33:

26. If the master counter 33 exceeds the total step test sequence length, then reset it to zero, and restart the MV step test sequence.
27. Reset the error code (indicating which MV has forced MV re-initialization) if the master counter 33 equals zero.
28. Implement the pre-programmed set point sequence for each MV. Step size is set by an appropriate variable that the user has access to while the code is executing. If the program is in HOLD mode, then move the soft MV target (i.e., shadow CV 25) limits out of the way (rely on the hard MV limits).

Set MV Resolution:

29. Vary the MV resolution depending on where the program is in the step test sequence. Use course resolution (large thresholds) while stepping its respective MV to enforce a staircase signal and introduce a desirable a-periodic limit cycle. Use high resolution when not stepping the respective MV to prevent undesired limit cycles. The objective is to encourage only one MV to move significantly at one time.
30. If the program is in HOLD mode, then use very high resolution to help the critical CV reach their new targets.
31. Change the MV tuning (MV Move Suppression in the case of DMC) to selectively discourage the MV's that are not being stepped at this time from moving. The DMC Minimum Move variable feature is used selectively to prevent correlated MV moves.

Repeat until the user terminates the program

Pseudo-Code Description

Input Calculations:

All input calculations are executed after the MPC algorithm has read in new process data, but before the control engine executes to calculate new MV values. The pseudo-code is listed below.

```
*************************************************************************
Define the following integer variables:
    I, J, K        ! Indexing variables
    COUNTER        ! Master Counter 33
    RELOAD         ! RELOAD = 1 if a controller configuration file reload has been detected
    SUSPEND        ! If the user has suspended the test, SUSPEND=1
    HOLD           ! If excessive CV violation has been detected, HOLD=1
    CONFIRM        ! If user chose Confirmation mode, do only clean steps
    INIZ           ! Used for MV initialization checks
    SAFE           ! SAFE=1 if all process CV's are within limits minus Delta
    TTSS           ! Time To Steady State (in samples)
Define the following integer arrays with dimension equal to the number of MV's in the controller 13:
```

```
        PULSE_CNT(IPMIND)         ! Pulse counters
        PULSE_PERIOD(IPMIND)      ! Minimum Pulse Period
Define the following real valued function:
        RANDOM    ! Random function (with 0.5 mean, uniform distribution, range between 0 and 1)
Define the following real arrays with dimension equal to the number of MV's in the controller 13:
        MVSUM(IPMIND)             ! Internal move accumulated MV's
        MVNOW(IPMIND)             ! Copies of the last MV values sent to Process Control System (PCS)
        THRESHOLD(IPMIND)         ! Default Threshold for move accumulation
        THRESH_NOW(IPMIND)        ! Current (variable) MV threshold
        MVSTEP(IPMIND)            ! Step Size in MV Target (Shadow CV 25)
                                  MVTARG_NOW(IPMIND)    ! Current MV target value in step test
                                  sequence
        MVTARGET(IPMIND)          ! Default MV targets (nominal values)
        CVINIT_LO(IPNDEP)         ! 'Middle of range' low limit for INIT
        CVINIT_HI(IPNDEP)         ! 'Middle of range' high limit for INIT
        CVDELTA(IPNDEP)           ! CV Delta values for MV Initialisation
        PULSE(IPMIND)             ! Pulse Signals (for Superposition of PRBS sequence) 17
BEGINNING OF PROGRAM
Now increment the master counter 33If in Suspend or Hold mode, then don't increment the counter 33
        IF COUNTER < No. Of MV's*TVSS+1 THEN         ! Max value = No. of MV's * TTSS
            IF (SUSPEND = 0) AND (HOLD = 0) THEN     ! Only increment if
                SET COUNTER = COUNTER + 1            ! not in Hold or Suspend mode
            ENDIF
        ELSE
                SET COUNTER = 0                      ! Reset to zero once max value is reached
        ENDIF
Check if any process CV's exceeded the Engineering limits. If so, then initiate HOLD mode:
Only check CV's that have normal status (ignore CV's that are turned off or BAD). Stay in HOLD mode
until reset by the INIT procedure.
CV Violation has detected, set HOLD mode on. Don't reset HOLD (only INIT procedure should do that).
FOR I = 1 to No. of Critical process CV's
        IF (CV Status(I) is Good) AND (HOLD = 0) THEN
            IF (CV Value(I) > CV Upper Engineering Limit (I)) OR (CV Value(I) <CV Lower
                                              Engineering Limit (I))) THEN
                HOLD = 1
            ENDIF
        ENDIF
NEXT I
Check if any MV's are in Wind-up Condition, initiate HOLD mode if required:
For I = 1 to Nr. of MV's                          ! Check all MV's
        IF MV Wind-up Status (I) is ON THEN       ! If MV is Wound up,
            HOLD = 1                              ! then set HOLD mode on
        ENDIF                                     ! Note: Any MV that tend to wind up
NEXT I                                            ! should have valve position as a CV
If not in Suspend mode, then clamp the CV limits to 'middle of range', open up all the MV limits:
IF (SUSPEND = 0) AND (HOLD = 1) THEN              ! If in HOLD mode, then . . .
Do the Shadow CV's (soft MV targets) 25:
        FOR I = 1 TO No. of MV's                              ! Open up shadow CV (MV) limits:
            Shadow CV Upper Limit(I) = MV Upper Limit(I)      ! Open high limit to MV operator limit
            Shadow CV Lower Limit(I) = MV Lower Limit(I)      ! Open low limit to MV operator limit
        NEXT I
Now do the process CVs:
        FOR I = 1 TO No. of Process CV's                      ! Do all Process CV's
            Process CV Upper Limit(I) = CVINIT_HI(I)          ! Clamp high limit to initialisation limits
            Process CV Lower Limits(I) = CVINIT_LO(I)         ! Clamp low limit to initialisation limits
        NEXT I
ENDIF
Now check if plant is ready for Initialisation of new MV targets:
INIZ = HOLD                       ! Only try to Initialise new MV targets if in HOLD mode
                                  ! Any CV that fails the Initialisation checks, will reset INIZ to 0
IF (INIZ = 1) THEN
        FOR I = 1 TO No. of Process CV's                                ! Only check process CV's
            IF (CV Value(I) > CVINIT_LO(I) – CVDELTA(I)) AND            ! DEP must be
                (CV Value(I) < CVINIT_HI(I) + CVDELTA(I))) THEN         ! between low
                INIZ = INIZ                                             ! and high +–
            ELSE                                                        ! delta value to keep INIZ
                INIZ = 0                                                ! else INIT failed (0)
            ENDIF                                                       ! if CV Values are between limits
        NEXT I
ENDIF                                                                   ! IF INIZ=0
If Initialisation checks passed, then Initialise the MV targets at the current MV values (on the PCS):
IF (INIZ = 1) THEN                                ! If it passed all Initialisation checks, then
        FOR I = 1 to No. of MV's                  ! For all MV's,
            MVTARGET(I) = Current MV value(I)     ! Grab new MV targets
        NEXT I                        !
ENDIF                                             ! If INIZ=1
Reset HOLD and INIZ flags:
IF (INIZ = 1) THEN                 ! MV Initialisation has been completed
        HOLD = 0                   ! HOLD can now be reset
```

-continued

```
ELSE                                          !
        HOLD = HOLD                           ! Stay in HOLD mode until INIT checks are passed
ENDIF
INIZ = HOLD                                   ! If still in HOLD mode, then keep on trying to Initialise
Check if all critical process CV's are safe (within their respective ranges):
SAFE = 1                                                      ! Initially, assume all CV's within
                                                                limits minus Delta's
FOR I = 1 TO No. of Shadow CV's                               ! For all the Shadow CV's 25, do
        IF (CV Value(I) > CVINIT_LO(I) + CVDELTA(I)) AND      ! CV value must be
           (CV Value(I) < CVINIT_HI(I) − CVDELTA(I)) THEN     ! between low and
                SAFE = SAFE                                   ! Keep Safe flag the same
        ELSE
                SAFE = 0                                      ! Safe check failed
        ENDIF
NEXT I
Generate Pulse Signals only if SAFE, and NOT in HOLD, and only when pulse counter exceeds Pulse Period
(otherwise, keep it constant):
FOR I = 1 TO No. of MV's              ! Generate PULSE signals 17 for all MV's 29 if SAFE
        IF (SAFE = 1) AND
           (PULSE_CNT(I) >= PULSE_PERIOD(I)) AND
           (HOLD = 0) THEN                    ! PULSE if SAFE, and NOT in HOLD
                IF (RANDOM > 0) THEN          ! IF random number is positive, then pulse
                        PULSE(I) = THRESHOLD(I)/2   ! up, else pulse down
                ELSE                          ! Use ½-amplitude
                        PULSE(I) = −THRESHOLD(I)/2  ! so that peak to peak value is
                ENDIF                         ! one full THRESHOLD value
        ELSE                                  ! If not SAFE, then keep
                PULSE(I) = PULSE(I)           ! PULSE signals the same
        ENDIF                                 ! IF SAFE
        PULSE_CNT(I) = PULSE_CNT(I) + 1       ! Increment pulse counter
        IF (PULSE_CNT(I) > PULSE_PERIOD(I)) THEN    ! Reset Pulse Counter to 0
                PULSE_CNT(I) = 0              ! when Pulse Period is reached
        ENDIF                                 ! IF PULSE_CNT
NEXT I
Check for reload of old Controller Configuration File and re-initialise MV copies if required. If PCS value is
significantly different from value in engine, then assume reload. All internal copies of the move accumulated
MV's need to be re-initialized at the current PCS value to prevent a bump in the MV's. Compare current MV
value and the MV value from the previous iteration:
RELOAD = 0
FOR I = 1 TO No. of MV's
        IF (ABS(Current MV Value(I) − Copy of Previous MV value(I)) > MVTOL(I)) THEN
                RELOAD = 1
        ENDIF
NEXT I
Re-initialize all the copies of the MV's if a reload has been detected:
IF (RELOAD = 1) THEN
        FOR I = 1 TO No. of MV's
                MVSUM(I) = Current MV value(I)    ! Re-initialise move accumulated MV
                MVNOW(I) = Current MV value(I)    ! Re-initialise copy of current MV value with
                                                    current PCS value
        NEXT I
ENDIF
END OF PROGRAM
Output Calculations:
All output calculations are executed after the control engine has calculated new MV values, but before new
MV values are sent to the PCS. The pseudo-code is shown below.
*********************************************************************************
BEGINNING OF PROGRAM
Implement Explicit Move Accumulation (Enforce Staircase Signals on all MV's):
Check that move-accumulated value does not exceeding MAXMOV rate of change limits:
FOR I = 1 TO Nr. of MV's              ! For all the MV's, do
                                      ! explicit move accumulation
        MVSUM(I) = MVSUM(I) + Current MV Move(I)
Limit Move Accumulated MV between MV Operator Limits
        MVSUM(I) = MIN(MAX(MVSUM(I),MV Lower Limit(I)),MV Upper Limit(I))    ! Observe hard MV
                                                                              ! limits
Enforce Staircase Signal on MV's:
        IF (ABS(MVSUM(I) − MVNOW(I)) > THRESHOLD(I)) THEN       ! New MV value
                MVNOW(I) = MVSUM(I)
        ENDIF
Generate Step Changes in MV Targets (Shadow CV's) 25:
        IF ((COUNTER >E 2*(I−1)*TTSS+1) AND (COUNTER <= (2*I−1)*TTSS)) THEN
                MVTARG_NOW(I) = MVTARGET(I) + 0.5*MVSTEP(I)
        ELSE
                MVTARG_NOW(I) = MVTARGET(I) − 0.5*MVSTEP(I)
        ENDIF
Check that the current MV values and the current shadow CV 25 values are close (within MVTOL(I)) before
setting the Shadow CV operator limits to MVTARG_NOW.
IF (ABS(Shadow CV value(I) − Current MV value(I)) > MVTOL(I)) THEN       ! If shadow CV's 25 have not
```

-continued

```
        ABORT                                                  ! been set up correctly, then abort
        ENDIF
        IF ((SUSPEND = 0) AND (HOLD = 0) AND (CONFIRM = 0)) THEN
                Shadow CV Lower Limit(I) = MVTARG_NOW(I)       ! Not in Suspend/Hold/Confirm modes
                Shadow CV Upper Limit(I) = MVTARG_NOW(I)       ! set shadow CV operator limits
        ENDIF
Set MV Thresholds.
When a shadow CV is being stepped, use course resolution to enforce a staircase signal and a large
non-periodic limit cycle with fast tuning (push against the MV rate of change limits), but use high resolution
and very slow tuning when an MV is not being stepped, to allow it to reach the shadow CV target (allow last
10% of TTSS for MV to reach target before next MV is stepped).
        IF ((COUNTER > 2*(I−1)*TTSS+1) AND (COUNTER <= 2*I*TTSS−TTSS/10)) THEN
                                                       ! Pick next MV to step
                THRESH_NOW(I) = THRESHOLD(I)           ! Use course resolution to
                                                       ! enforce staircase signal
                MV Move Suppression(I) = 0.01001       ! Use very fast tuning
                                                       ! to follow MV targets
                MV Cost Criterion(I) = 0               ! Use min move variable when
                                                       ! stepping an MV
        ELSE
                THRESH_NOW(I) = THRESHOLD(I)/50        ! Use high resolution to
                                                       ! allow MV to reach target
                MV Move Suppression(I) = 100           ! Use very slow tuning to
                                                       ! discourage MV moves
                MV LP Cost Criterion(I) = 1            ! Use Min Cost if not stepping
                                                       ! to prevent LP from using it
                PULSE(I) = 0                           ! Remove PRBS Pulse Signal if not stepping
        ENDIF
Override MV resolution if in Hold mode (use medium resolution for Hold mode):
    IF (HOLD = 1) THEN
        THRESH_NOW(I) = THRESHOLD(I)/5     ! Use medium resolution
        MV LP Cost Criterion(I) = 0        ! Use Min Move if searching
        PULSE(I) = 0                       ! Remove Pulse Signal 17
    ENDIF                                  ! for new targets
Override resolution if in Confirmation mode (use very high resolution for Confirmation Mode):
    IF (CONFIRM = 1) THEN
        THRESH_NOW(I) = THRESHOLD(I)/20    ! Use high resolution
        PULSE(I) = 0                       ! Remove Pulse Signal 17
    ENDIF
MV Target Infeasibility:
If the MV (shadow CV 25) that is being stepped right now does not have a feasible target, then
accept that any disturbances in the active (genuine) CV's will introduce moves in the 'active' MV's.
Reduce the correlation between MV and active CV by using low resolution.
Since genuine CV's are active with potentially poor models, use medium slow tuning.
    IF (ABS(CV Steady State Error(I)) > 0) THEN    ! If shadow CV target cannot
                                                   ! be reached (another CV is active),
        THRESH_NOW(I) = THRESHOLD(I)/5             ! then use low resolution
        MV Move Suppression(I) = 5                 ! Use medium fast tuning when
                                                   ! genuine CV's are active
        PULSE(I) = 0                               ! Remove Pulse Signal 17
    ENDIF                                          !
Override resolution, move suppression and LP cost criterion if in Suspend mode:
    IF (SUSPEND = 1) THEN                          ! User has turned program OFF
        PULSE(I) = 0                               ! Remove Pulse Signal 17
        THRESH_NOW(I) = THRESHOLD(I)/50            ! Use very high resolution
        MV Move Suppression = 5                    ! Use medium slow tuning
        MV LP Cost Criterion(I) = 1                ! Assume all MV's are min cost
    ENDIF
Add Pulse Signals to MV sequences (superimpose PRBS signal 17):
    MVNOW(I) = MVNOW(I) + PULSE(I)                 ! Add Pulse Signal 17 to MV 29
Enforce MAXMOV on MVNOW:
    IF (MVNOW(I) > Current MV Value(I) + MV Maximum Move(I)) THEN    ! Positive Rate of Change
        MVNOW(I) = Current MV Value(I) + MV Maximum Move(I)          ! Limit Check
    ENDIF
    IF (MVNOW(I) < Current MV Value(I) − MV Maximum Move(I)) THEN    ! Negative Rate of Change
        MVNOW(I) = Current MV Value(I) − MV Maximum Move(I)          ! Limit Check
    ENDIF
    MVNOW(I) = MIN(MAX(MVNOW(I),MV Lower Limit(I)),MV Upper Limit(I))  ! Observe hard
                                                                       ! MV limits
Note: MVNOW(I) will be written out after Output Calculations have been completed.
NEXT I
Implement Explicit Move Accumulation (Enforce Staircase Signals on all MV's):
Check that move-accumulated value does not exceed MAXMOV rate of change limits
FOR I = 1 TO Nr. Of MV's                   ! For all the MV's, do
                                           ! explicit move accumulation
        MVSUM(I) = MVSUM(I) + Current MV Move(I)
Limit Move Accumulated MV between MV Operator Limits
        MVSUM(I) = MIN(MAX(MVSUM(I),MV Lower Limit(I)),MV Upper Limit(I))
                                           ! Observe hard MV limits
```

```
-continued

Enforce Staircase Signal on MV's
      THRESHOLD(I) = MVTOL(I)*(RAND*2−1)          ! RAND is a uniform random function (0,1)
      IF (ABS(MVSUM(I) − MVNOW(I)) > THRESHOLD(I)) THEN ! New MV value
            MVNOW(I) = MVSUM(I)
      ENDIF
Check that Current MV and Shadow CV values are close (within MVTOL) before setting the Shadow CV
operator limits to MVTARG_NOW.
      IF (ABS(Shadow CV value(I) − Current MV Value(I)) > MVTOL(I)) THEN ! If shadow CV's 25
            ABORT                                              ! have not been set up
                                                               ! correctly, then abort!
      ENDIF
Add Pulse Signals 17 to MV sequences 29:
            MVNOW(I) = MVNOW(I) + PULSE(I)              ! Add Pulse Signal 17 to MV29
Enforce Maximum Move constraint on MVNOW:
            IF (MVNOW(I) > Current MV value(I) + MV Current Move(I)) THEN ! Positive Rate of Change
                  MVNOW(I) = Current MV Value(I) + MV Current Move(I)     ! Limit Check
            ENDIF
            IF (MVNOW(I) < Current MV Value(I) − MV Current Move(I)) THEN ! Negative Rate of Change
                  MVNOW(I) = Current MV Value(I) − MV Current Move(I)     ! Limit Check
            ENDIF
            MVNOW(I) = MIN(MAX(MVNOW(I), MV Lower Limit(I)), MV Upper Limit(I))
                                                               ! Observe hard MV limits
NEXT I
Now over-write the new calculated MV value with MVNOW:
New MV Value = MVNOW(I)          ! Complete MV re-calculation
END OF PROGRAM
```

While this invention has been particularly shown and described with references to preferred embodiments thereof, it will be understood by those skilled in the art that various changes in form and details may be made therein without departing from the scope of the invention encompassed by the appended claims.

For example, it is understood that the above discussed CV model 15, counter 33, MPC controller 13, overlaid PRBS signals 16, 17 and current MV values module 31 are implemented in software (and/or hardware) 23 executed on digital processing means 35, 37. The digital processing means 35, 37 may employ distributed processing across multiple computers, may be a network of computers and may employ a variety of other architectures, data structures, communications structures and the like. Further, each component 15, 33, 13, 16, 17, 31 of software 23 may be implemented in a variety of ways by a common module or multiple modules. The foregoing description of these components was for purposes of functionally illustrating the present invention and not for limiting the invention.

Also other alternative discretization methods other than internal move accumulation 40 and variable dead zones to prevent feedback correlation is in the purview of one skilled in the art given the foregoing discussion of the present invention.

Similarly, alternatives to shadow CV's 25, especially for highly co-linear systems (like distillation columns) are suitable.

Also various non-linear variable structure (sliding mode) control methods for generating the MV moves 40, based on the sign of the gains only, or other non-linear processing (NLP) to generate the move plan for very low MV resolution are suitable.

What is claimed is:

1. A method of modeling a process system comprising the steps of:

(a) modeling a subject process system with an initial model;

(b) coupling to the subject process system a multivariable process control system that utilizes said initial model augmented with shadow system controlled variables that are mathematically and functionally equivalent to system manipulated variables, where each shadow system variable corresponds to a respective manipulated variable, to control the subject process system with large independent step changes in one shadow system variable at a time;

(c) tuning said multivariable process control system for stable operation of the subject process system; and (d) using data generated from said subject process system, generating an improved model of the subject process system, said steps of tuning and generating effectively perturbing the subject process system to generate data for model identification of the subject process system.

2. A method as claimed in claim 1 further comprising repeating steps (b) through (d) with said improved model as the initial model such that a further improved model is generated.

3. A method as claimed in claim 1, wherein the steps of tuning and generating are accomplished in parallel with step testing.

4. A method as claimed in claim 1, wherein any combination of the steps is done remotely via a high speed communication link and digital processor, such that a reduction in engineering supervision is enabled.

5. A method as claimed in claim 1, wherein the multivariable process control system employs a constrained, model-based controller.

6. A method as claimed in claim 1, wherein step (a) of modeling said subject process system includes one of:

using an existing model from a potentially different but similar process system;

deriving a model from a non-model based process control system;

deriving a model from a manual step test of said subject process system; and deriving a model from engineering knowledge of said subject process system.

7. A method as claimed in claim 1, wherein step (b) of coupling to said subject process system includes the multivariable process control system employing an explicit or implicit model, where an explicit model is a model describable by a mathematical equation, and where an implicit model is a model not describable by a mathematical equation.

8. A method as claimed in claim 7, wherein said multivariable process control system employs at least one of:
   sliding mode control;
   switching mode control structures; and
   variable structure control.

9. A method as claimed in claim 1, wherein step (b) of coupling to said subject process system includes controlling said shadow system control variables that are equal to the initial model predicted values when controlled variables of the subject process system are within subject process limit values.

10. A method as claimed in claim 1, wherein step (b) of coupling to said subject process system includes computing process control action for controlled variables and manipulated variables in accordance with an objective function J.

11. A method as claimed in claim 1, wherein step (b) of coupling to said subject process system includes using target values calculated via a robust steady-state target calculation.

12. A method as claimed in claim 1, wherein step (b) of coupling to said subject process system includes augmenting the initial model with said shadow system controlled variables, where shadow system controlled variables may be treated as system controlled variables.

13. A method as claimed in claim 1, wherein step (b) of coupling to said subject process system includes imposing a dead zone on controlled variables of the multivariable process control system.

14. A method as claimed in claim 1, wherein step (b) of coupling to said subject process system includes creating a time varying, almost periodic limit cycle of manipulated variables of the subject process system.

15. A method as claimed in claim 1, wherein step (b) of coupling to said subject process system includes calculating suitable targets for system manipulated variables of the subject process system.

16. A method as claimed in claim 1, wherein step (c) of tuning said multivariable process control system includes adjusting internal variables of the multivariable process control system in a manner that improves process control action and ensures process system safety.

17. A method as claimed in claim 1, wherein step (b) of coupling to said subject process system includes computing process control action in accordance with subject process variable limit values and subject process system disturbances, wherein subject process system disturbances are unmeasured extraneous influences affecting the subject process system and not captured in the initial model.

18. A method as claimed in claim 1, wherein step (d) of using data and generating an improved model includes using a system identification algorithm and analyzing values of manipulated variables and controlled variables of the subject process system to create an improved model.

19. A method as claimed in claim 9, wherein said step of controlling equivalent system manipulated variables is in accordance with one of:
   an objective function J;
   a simultaneous moving of one or more shadow system controlled variables or system manipulated variables;
   for an amount of time, moving of one or more shadow system controlled variables or system manipulated variables;
   a superimposed PRBS sequence;
   a normalized system manipulated variable-system controlled variable gain, the normalized gain being normalized to unity and used as the shadow system controlled variable; and
   an adjustment of shadow system controlled variables targets to prevent shadow system controlled variables from violating subject process control variable limits.

20. A method as claimed in claim 10, wherein said objective function J is extremized.

21. A method as claimed in claim 12, wherein step (b) of coupling to said subject process system includes moving or stepping one or more system manipulated variables or said shadow system controlled variables simultaneously.

22. A method as claimed in claim 12, wherein step (b) of coupling to said subject process system includes adjusting shadow system controlled variables targets to prevent shadow system controlled variables from violating subject process control variable limits.

23. A method as claimed in claim 13, wherein the dead zone is computed by accumulating relatively small manipulated variable control action from said multivariable process control system and implementing the control action when summed control action reaches a predefined threshold.

24. A method as claimed in claim 13, wherein the dead zone is generated by modifying mathematical formulation of the multivariable process control system.

25. A method as claimed in claim 13, wherein the dead zone is generated by an analogue to digital converter.

26. A method as claimed in claim 13, wherein the dead zone is generated by pulse width modulation.

27. A method as claimed in claim 14, wherein system controlled variables are filtered to attenuate low frequency noise.

28. A method as claimed in claim 15, wherein said suitable targets for system manipulated variables are chosen manually by a human operator.

29. A method as claimed in claim 15, wherein said suitable targets for system manipulated variables are determined by one of:
   a middle value of process control limit values for controlled variables of the subject process system;
   a partial least squares analysis;
   a principle components analysis; and
   a value furthest away from process control limit values of both manipulated variables and controlled variables of the subject process system.

30. A method as claimed in claim 15, wherein the suitable targets for system manipulated variables are automatically determined and implemented by a digital processing system, in a manner that enables reduction of engineering supervision.

31. A method as claimed in claim 15, wherein the manipulated variables are stepped or moved in a random way about the suitable targets while keeping said manipulated variables and controlled variables of the subject process system within process control limit values.

32. A method as claimed in claim 16 wherein said adjusting reduces feedback correlation between control action of the multivariable process control system and disturbances of the subject process system.

33. A method as claimed in claim 17 further comprising adjusting internal tuning variables such that feedback correlation between control action of the multivariable process control system and disturbances of the subject process system is reduced.

34. A method as claimed in claim 21, wherein step (b) of coupling to said subject process system includes moving or stepping one or more system manipulated variables or said shadow system controlled variables for a fixed or varying amounts of time.

35. A method as claimed in claim 23, wherein the controlled variables are filtered to attenuate high frequency noise.

36. A method as claimed in claim 24, wherein the mathematical formulation employs discrete or binary system manipulated variables.

37. A method as claimed in claim 34, wherein step (b) of coupling to said subject process system includes superimposing a pseudo-random binary sequence (PRBS) on said moves or steps of the system manipulated variables and said shadow system controlled variables.

38. A method as claimed in with claim 34, wherein step (b) of coupling to said subject process system includes normalizing a system manipulated variable-system controlled variable gain relation to unity and using the normalized gain relation as the shadow system controlled variable.

39. Apparatus for modeling a process system, comprising:
an initial model of a subject process system;
a multivariable process controller coupled to the subject process system, the multivariable process controller utilizing the initial model augmented with shadow system controlled variables, where each shadow system variable corresponds to a respective manipulated variable, to control the subject process system with large independent step changes in one shadow system variable at a time; and
computer means coupled to the multivariable process controller, the computer means effectively perturbing the subject process system, to generate data for model identification of the subject process system, by (i) tuning the multivariable process controller for stable operation of the subject process system and (ii) using data generated by the subject process system, generating an improved model of the subject process system.

40. Apparatus as claimed in claim 39 wherein:
the multivariable process controller utilizes the improved model to control the subject process system; and
the computer means repeatedly tunes the multivariable process controller and generates further improved models of the subject process system.

41. Apparatus as claimed in claim 39, wherein the multivariable process controller tuning and generating are accomplished in parallel with step testing.

42. Apparatus as claimed in claim 39, wherein the initial model, the multivariable process controller and computer means are coupled to a high speed communication link enabling remote operation.

43. Apparatus as claimed in claim 39, wherein the computer means enables engineering supervision to be gradually reduced.

44. Apparatus as claimed in claim 39, wherein the initial model is one of:
an existing model from a potentially different but similar process system;
a model derived from a non model-based process control system;
a model derived from a manual step test of the subject process system;
a model derived from engineering knowledge of the subject process system.

45. Apparatus as claimed in claim 39, wherein the multivariable process controller is a constrained, model-based system.

46. Apparatus as claimed in claim 39, wherein the multivariable process controller employs an explicit or implicit model, where an explicit model is a model describable by a mathematical equation, and where an implicit model is a model not describable by a mathematical equation.

47. Apparatus as claimed in claim 46, wherein said multivariable process controller employs one of:
sliding mode control;
switching mode control structures; and
variable structure control.

48. Apparatus as claimed in claim 39, wherein the computer means controls said shadow system control variables of the subject process system.

49. Apparatus as claimed in claim 39, wherein the computer means computes process control action for controlled variables and manipulated variables in accordance with an objective function J.

50. Apparatus as claimed in claim 39, wherein the multivariable process controller uses targets calculated via a robust steady-state target calculation.

51. Apparatus as claimed in claim 39, wherein the computer means augments the initial model with shadow system controlled variables, where shadow system controlled variables may be treated as system controlled variables.

52. Apparatus as claimed in claim 39, wherein the computer means imposes a dead zone on controlled variables of the multivariable process controller.

53. Apparatus as claimed in claim 39, wherein the computer means creates a time varying almost periodic limit cycle of system manipulated variables.

54. Apparatus as claimed in claim 39, wherein the computer means calculates suitable targets for manipulated variables of the subject process system.

55. Apparatus as claimed in claim 39, wherein the computer means adjusts internal variables of the multivariable process controller.

56. Apparatus as claimed in claim 39, wherein the computer means further computes process control action in accordance with subject process variable limit values and subject process system disturbances, wherein subject process system disturbances are unmeasured extraneous influences affecting the subject process system and not captured in the initial model.

57. Apparatus as claimed in claim 39, wherein the computer means uses a system identification algorithm to analyze values of manipulated variables and controlled variables of the subject process system to create an improved model.

58. Apparatus as claimed in claim 39, wherein:
the multivariable process controller includes a closed-loop process control system that generates values for manipulated variables and controlled variables of the subject process system for model identification; and
the generated data includes an open-loop process control system.

59. Apparatus as claimed in claim 48, wherein the computer means controls the equivalent manipulated variables in accordance with one of:
an objective function J;
a simultaneous moving of one or more shadow system controlled variables or system manipulated variables;
for an amount of time, moving of one or more shadow system controlled variables or system manipulated variables;
a superimposed PRBS sequence;
a normalized system manipulated variable-system controlled variable gain, the normalized gain being normalized to unity and used as the shadow system controlled variable; and an adjustment of shadow system controlled variables targets to prevent shadow system controlled variables from violating subject process control variable limits.

60. Apparatus as claimed in claim 49, wherein said objective function J is extremized.

61. Apparatus as claimed in claim 51, wherein the multivariable process controller moves or steps one or more system manipulated variables or said shadow system controlled variables simultaneously.

62. Apparatus as claimed in claim 51, wherein the computer means further adjusts shadow system controlled variables targets to prevent shadow system controlled variables from violating subject process control variable limits.

63. Apparatus as claimed in claim 52, wherein the dead zone is computed by accumulating small manipulated variable control action from said multivariable process controller and implementing the control action when summed control action reaches a predefined threshold.

64. Apparatus as claimed in claim 52, wherein the said dead zone is generated by modifying mathematical formulation of the multivariable process controller.

65. Apparatus as claimed in claim 52, wherein the dead zone is generated by an analogue to digital converter.

66. Apparatus as claimed in claim 52, wherein the said dead zone is generated by pulse width modulation.

67. Apparatus as claimed in claim 53, wherein system controlled variables are filtered to attenuate low frequency noise.

68. Apparatus as claimed in claim 54, wherein said suitable manipulated variable targets are chosen manually by a human operator.

69. Apparatus as claimed in claim 54, wherein the computer means calculates suitable manipulated variable targets according to one of:

a middle value of process control limit values for controlled variables of the subject process;

a value furthest away from process control limit values for both manipulated variables and controlled variables of the subject process system;

a partial least squares analysis; and a principle components analysis.

70. Apparatus as claimed in claim 54, wherein the manipulated variables are stepped or moved in a random way about the said suitable targets while keeping said manipulated variables and controlled variables of the subject process system within said process control limit values.

71. Apparatus as claimed in claim 55 wherein the computer means adjusting reduces feedback correlation between control action of the multivariable process controller and disturbances of the subject process system.

72. Apparatus as claimed in claim 56 wherein the computer means further adjusts internal tuning variables such that feedback correlation between control action of the multivariable process controller and disturbances of the subject process system is reduced.

73. Apparatus as claimed in claim 61, wherein the multivariable process controller moves or steps one or more system manipulated variables or said shadow system controlled variables for a fixed or varying amounts of time.

74. Apparatus as claimed in claim 63, wherein the controlled variables are filtered to attenuate high frequency noise.

75. Apparatus as claimed in claim 64, wherein the mathematical formulation employs discrete or binary system manipulated variables.

76. Apparatus as claimed in claim 73, wherein the multivariable process controller superimposes a pseudo-random binary sequence (PRBS) on said moves or steps of the system manipulated variables and said shadow system controlled variables.

77. Apparatus as claimed in claim 73, wherein the multivariable process controller normalizes a system manipulated variable-system controlled variable gain relation to unity and uses the normalized gain relation as the shadow system controlled variable.

78. A controller comprising:

a digital processor; and a program storage device that is readable by said digital processor and that encodes a program of instructions for performing a method of modeling a subject process system comprising the steps of:

(a) modeling the subject process system with an initial model;

(b) controlling the subject process system with a multivariable process control system that utilizes said initial model augmented with shadow system controlled variables, where each shadow system variable corresponds to a respective manipulated variable, by large independent step changes in one shadow system variable at a time;

(c) tuning said multivariable process control system for stable operation of the subject process system; and (d) using data generated from said subject process system, generating an improved model of the subject process system, said steps of tuning and generating effectively perturbing the subject process system to generate data for model identification of the subject process system.

79. A controller as claimed in claim 78 wherein step (b) of controlling the subject process system includes augmenting the initial model with shadow system controlled variables, where shadow system controlled variables may be treated as system controlled variables.

80. A controller as claimed in claim 78 wherein step (b) of controlling the subject process system includes imposing a dead zone on controlled variables of the multivariable process control system.

81. A controller as claimed in claim 78 wherein step (b) of controlling the subject process system includes calculating suitable targets for system manipulated variables of the subject process system.

82. A controller as claimed in claim 78 wherein:

step (b) includes a closed-loop process control system that generates values for manipulated variables and controlled variables of the subject process system in accordance with step (d); and the generated data includes an open-loop process control system.

83. A controller as claimed in claim 79 wherein step (b) of controlling the subject process system includes moving or stepping one or more system manipulated variables or said shadow system controlled variables simultaneously.

84. A controller as claimed in claim 83 wherein step (b) of controlling the subject process system includes superimposing a pseudo-random binary sequence (PRBS) on said moves or steps of the system manipulated variables and said shadow system controlled variables.

85. A program storage device encoding a machine-readable copy of a program of instructions, said program of instructions being executed by a computer for performing a method of modeling a subject process system comprising the steps of:

(a) modeling a subject process system with an initial model;

(b) controlling the subject process system with a multivariable process control system that utilizes said initial model augmented with shadow system controlled variables, where each shadow system variable corresponds to a respective manipulated variable, by large independent step changes in one shadow system variable at a time;

(c) tuning said multivariable process control system for stable operation of the subject process system; and (d) using data generated from said subject process system, generating an improved model of the subject process system, said steps of tuning and generating effectively perturbing the subject process system to generate data for model identification of the subject process system.

86. A program storage device of claim 85 wherein:

step (b) includes a closed-loop process control system that generates values for manipulated variables and controlled variables of the subject process system in accordance with step (d); and the generated data includes an open-loop process control system.

* * * * *